(12) United States Patent
Cachro

(10) Patent No.: US 11,962,651 B2
(45) Date of Patent: Apr. 16, 2024

(54) METHOD AND APPARATUS FOR COMMISSIONING A SENSOR

(71) Applicant: Dynapar Corporation, Elizabethtown, NC (US)

(72) Inventor: Robert Cachro, Prospect Heights, IL (US)

(73) Assignee: DYNAPAR CORPORATION, Elizabethtown, NC (US)

( * ) Notice: Subject to any disclaimer, the term of this patent is extended or adjusted under 35 U.S.C. 154(b) by 0 days.

(21) Appl. No.: 18/149,852

(22) Filed: Jan. 4, 2023

(65) Prior Publication Data

US 2023/0216923 A1 Jul. 6, 2023

Related U.S. Application Data

(60) Provisional application No. 63/296,782, filed on Jan. 5, 2022.

(51) Int. Cl.
*H04L 67/12* (2022.01)
*G01C 22/00* (2006.01)
*G06K 7/10* (2006.01)
*G06K 7/14* (2006.01)

(52) U.S. Cl.
CPC ............. *H04L 67/12* (2013.01); *G01C 22/00* (2013.01); *G06K 7/10366* (2013.01); *G06K 7/1413* (2013.01); *G06K 7/1417* (2013.01)

(58) Field of Classification Search
CPC .... H04L 67/12; G01C 22/00; G06K 7/10366; G06K 7/1413; G06K 7/1417
See application file for complete search history.

(56) References Cited

U.S. PATENT DOCUMENTS

| 11,089,107 B1* | 8/2021 | Chor .................... H04L 63/08 |
| 2006/0206291 A1 | 9/2006 | Bash et al. |
| 2013/0197859 A1* | 8/2013 | Albano ................. G10L 17/00 702/150 |
| 2013/0218816 A1* | 8/2013 | Yu ........................ G06N 20/00 706/12 |

(Continued)

OTHER PUBLICATIONS

International Search Report for International Application No. PCT/US2023/060094 dated Apr. 3, 2023, 4 pages.

(Continued)

*Primary Examiner* — Omer S Khan
(74) *Attorney, Agent, or Firm* — Jordan IP Law LLC

(57) ABSTRACT

In an embodiment, a method for commissioning a sensor via a communication unit includes scanning, by the communication unit, a sensor-identifying feature of the sensor to provide sensor-identifying data and sending, by the communication unit to a system controller, the sensor-identifying data. The method further includes receiving, by the communication unit from the system controller, one or more contextual prompts regarding a sensed object to which the sensor is operatively connected and, in response to the contextual prompts, sending, by the communication unit to the system controller, sensed object context information. Thereafter, the method further comprises receiving, by the communication unit from the system controller, confirmation of commissioning of the sensor. A corresponding method in the system controller, as well as corresponding apparatus, are also described.

30 Claims, 12 Drawing Sheets

(56) References Cited

U.S. PATENT DOCUMENTS

| | | | | |
|---|---|---|---|---|
| 2016/0189051 A1* | 6/2016 | Mahmood | ................ | G06N 7/01 |
| | | | | 706/11 |
| 2018/0295508 A1* | 10/2018 | Kyllonen | .............. | H04W 12/08 |
| 2020/0271488 A1* | 8/2020 | Tanutama | .............. | G01D 21/00 |
| 2021/0396544 A1* | 12/2021 | Guo | ......................... | H04Q 9/00 |

OTHER PUBLICATIONS

Written Opinion of the International Search Authority for International Application No. PCT/US2023/060094 dated Apr. 3, 2023, 6 pages.

\* cited by examiner

METHOD AND APPARATUS FOR COMMISSIONING A SENSOR

FIELD

The present disclosure concerns remotely deployed sensors, such as hubodometers, and in particular, concerns methods and apparatus for commissioning such sensors.

BACKGROUND

As known in the art, a wide variety of sensors are typically deployed "in the field," i.e., remotely or in mobile contexts. Such sensors are often "smart" sensors with various capabilities beyond sensing of a physical parameter, including, in some cases, the ability to communicate with a centralized controller. Examples of such smart sensors are hubodometers (or hubometers), which are rotary sensors attached to an axle of a wheel-based vehicle that tracks rotations of the axle and, thereby, distances traveled by the vehicle. Typically, prior to such field-deployed sensors being put into active duty, the sensor are commissioned for service by associating each sensor with an administrator, i.e., an entity (such as a person or organization) granted permission to access data associated with the sensor in or more databases and/or authorized to update information concerning the sensor in such databases. Further, the commissioning process will typically also include providing information regarding the object with which the sensor is deployed, i.e., information regarding the sensed object. For example, once again in the context of hubodometers, information regarding the vehicle on which a given hubodometer is deployed may be obtained and associatively stored with information identifying the sensor.

Typically, the commissioning process for a remotely deployed sensor involves manually entering sensor-identifying data (e.g., a serial number, an International Mobile Equipment Identity (IMEI) number, etc.) via a web application that operates to store the identifying data. However, such manual data entry often leads to input errors that, in turn, lead to user frustration and/or incorrectly stored data. Thus, techniques that overcome such challenges would be a welcome addition to the state of the art.

SUMMARY

Techniques for overcoming the above-noted challenges include one or more methods for commissioning a sensor via a communication unit. Such a method includes scanning, by the communication unit, a sensor-identifying feature of the sensor to provide sensor-identifying data and sending, by the communication unit to a system controller, the sensor-identifying data. The method further includes receiving, by the communication unit from the system controller, one or more contextual prompts regarding a sensed object to which the sensor is operatively connected and, in response to the contextual prompts, sending, by the communication unit to the system controller, sensed object context information. Thereafter, the method further comprises receiving, by the communication unit from the system controller, confirmation of commissioning of the sensor.

In an embodiment, the method of commissioning further comprises receiving, by the communication unit from the system controller, one or more sensor type prompts and sending, by the communication unit to the system controller, an identification of a type of the sensor.

In another embodiment, the method of commissioning further includes sending, by the communication unit to the system controller, information regarding an entity requesting commissioning of the sensor and, after sending the sensor-identifying data, receiving, by the communication unit from the system controller, confirmation that an entity affiliated with the communication unit is authorized to access information regarding the sensor.

In another embodiment, the sensed object is a vehicle and the sensor is a hubodometer. In this case, the sensed object information includes at least one of vehicle identifying information, vehicle type information or odometer reading of the vehicle.

In another embodiment, the sensor-identifying feature is any one of a barcode, a QR code or an RFID tag.

In yet another embodiment, the method of commissioning further includes, subsequent to receiving the confirmation of commissioning, scanning, by the communication unit, the sensor-identifying feature of the sensor to provide subsequent sensor-identifying data and thereafter sending, by the communication unit to the system controller, the subsequent sensor-identifying data. Responsive to the subsequent sensor-identifying data thus sent, the method further includes receiving, by the communication unit from the system controller, information regarding the sensor.

Techniques for overcoming the above-noted challenges also include one or more methods for commissioning a sensor via a system controller. Such a method includes receiving, by the system controller from a communication unit, sensor-identifying data obtained by the communication unit by scanning a sensor-identifying feature of the sensor. The method further comprises sending, by the system controller to the communication unit, one or more contextual prompts regarding a sensed object to which the sensor is operatively connected and receiving, by the system controller from the communication unit, sensed object context information in response to the contextual prompts. Thereafter, the method comprises storing, by the system controller, the sensor-identifying data in association with the sensed object context information and sending, by the system to controller to the communication unit, confirmation of commissioning of the sensor.

In an embodiment, the method of commissioning further comprises receiving, by the system controller from the communication unit, information identifying an entity affiliated with the communication unit and, after receiving the sensor-identifying data, determining, by the system controller, that the entity affiliated with the communication unit is authorized to access information regarding the sensor. The method further includes sending, by the system controller to the communication unit, confirmation that the entity is authorized to access information regarding the sensor. In this embodiment, the method my further include, when determining that the entity is authorized to access information regarding the sensor, steps of sending, by the system controller to a device affiliated with an administrator of the sensor, a request to confirm that the entity is authorized to access to the information regarding the sensor, and thereafter receiving, by the system controller from the device affiliated with the administrator, confirmation that the entity is authorized to access information regarding the sensor.

In another embodiment, the method of commissioning further comprises sending, by the system controller to the communication unit, one or more sensor type prompts, and thereafter receiving, by the system controller from the communication unit, an identification of a type of the sensor.

Once again in this embodiment, the sensed object may comprise a vehicle and the sensor may comprise a hubodometer and, further, the sensed object context information may include at least one of vehicle identifying information, vehicle type information or odometer reading of the vehicle.

Further still in this embodiment, the sensor-identifying feature may comprise any one of a barcode, a QR code or an RFID tag.

In yet another embodiment, the method of commissioning further includes, subsequent to sending the confirmation of commissioning, steps of receiving, by the system controller from the communication unit, the sensor-identifying data of the sensor to provide subsequent sensor-identifying data and, responsive to the subsequent sensor-identifying data, sending, by system controller to the communication unit, information regarding the sensor.

Corresponding communication unit and system controller apparatus are also disclosed.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

As used herein, phrases substantially similar to "at least one of A, B or C" are intended to be interpreted in the disjunctive, i.e., to require A or B or C or any combination thereof unless stated or implied by context otherwise. Further, phrases substantially similar to "at least one of A, B and C" are intended to be interpreted in the conjunctive, i.e., to require at least one of A, at least one of B and at least one of C unless stated or implied by context otherwise. Further still, the term "substantially" or similar words requiring subjective comparison are intended to mean "within manufacturing tolerances" unless stated or implied by context otherwise.

As used herein, the phrase "operatively connected" refers to at least a functional relationship between two elements and may encompass configurations in which the two elements are directed connected to each other, i.e., without any intervening elements, or indirectly connected to each other, i.e., with intervening elements.

Figure 1:
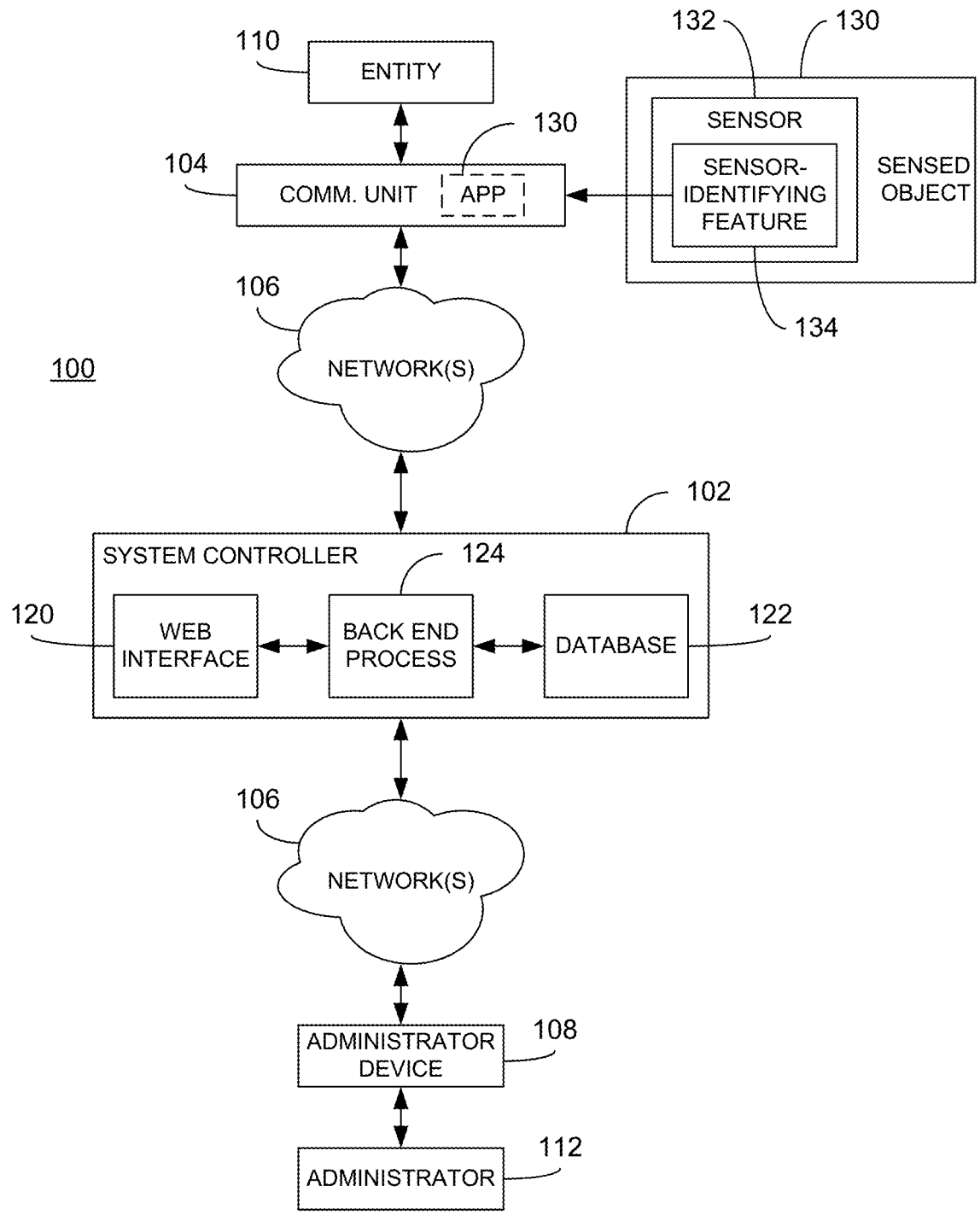
FIG. 1 is a block diagram schematically illustrating a communication system comprising a communication unit and a system controller in accordance with the instant disclosure.

Referring now to FIG. 1, a system 100 in accordance with the instant disclosure is shown. Specifically, the system 100 comprises a system controller 102 in communication with a plurality of communication units 104 (only one shown for ease of illustration) via one or more intervening networks 106. As described in greater detail below, the system controller 102 may comprise one or more server computers, database servers or other types of computing devices as known in the art, particularly in connection with, for example, the implementation of websites and/or enterprise software. Similarly, the communication units 104 may comprise, in one embodiment, wireless communication units deployed for the use by entities 110, e.g., individual users or small groups of individual users. For example, the communication units 104 may comprise camera-equipped smart phones, handheld computers having scanning capability (as described below) or the like. Although a single communication unit 104 and user 110 is illustrated in FIG. 1, it is understood that a large number of communication units and users may be accommodated in the system of FIG. 1. Furthermore, while the communication units described herein will typically be mobile communication units having wireless communication ability, the present invention is not limited in this regard as devices relying on wired communication features, e.g., a desktop computer equipped with a suitable scanning device, may be equally employed.

Regardless of their form, the communication units 104 or other computing devices used to communicate with the system controller 102 may employ well-known communication protocols (e.g., the Internet Protocol Suite or TCP/IP supporting HTTP) for this purpose. The network(s) 106 may comprise a public network (e.g., the Internet, World Wide Web, etc.) or private network (e.g., local area network (LAN), etc.) or combinations thereof (e.g., a virtual private network, LAN connected to the Internet, etc.). Furthermore, the network 106 need not be a wired network only, and may comprise wireless network elements as known in the art. As described in further detail below, the system controller 102 facilitates commissioning of sensors via the communication units 104. As noted above, each entity 110 may be an individual person or relatively small group of persons (e.g., one or more field technicians) tasked with commissioning sensors. Alternatively, one or more of the entities 110 may be identified as an organization authorized to commission sensors as described herein. In an embodiment, each communication unit 104 may be uniquely associated with a given user (e.g., a mobile phone issued to that user) or may comprise a shared resource amongst multiple users (e.g., several users all employed by the same organization).

As described in greater detail below, each of the communication units 104 is configured to obtain sensor-identifying data from a sensor 132 deployed in relation to a sensed object 130. As used herein, a sensed object 130 is any object having one or more parameters that are subject to being sensed by the sensor 132. Further, each sensor 132 includes a sensor-identifying feature 134 incorporated into the sensor itself. The sensor-identifying feature may comprise any machine-readable feature that may be interrogated (i.e., scanned) to provide data that uniquely identifies the sensor 132. Examples of optically interrogated sensor-identifying features include well-known one-dimensional barcodes or two-dimensional codes such as so-called Quick Response (QR) codes. Further examples include various instances of radio frequency identification (RFID) tags, such as near-field communication (NFC) tags. As known in the art, such RFID tags may be passive, i.e., requiring energy to be provided by the interrogating device, or active, i.e., having an internal power source and therefore independent of the interrogating device. Regardless of how its implemented, each sensor-identifying feature 134 encodes (using known techniques) sensor-identifying data such as a unique identification code, etc. as described above.

FIG. 1 also illustrates an administrator device 108, which may comprise a device similar to the communication units 104 or another type of computing device, e.g., a desktop computer. As shown, each administrator device 108 has one or more administrators 112 associated therewith. As used herein, an administrator of a sensor is an entity, such as an organization, an individual or group of individuals, having rights to not only access information and data about the sensor, but to also modify such information and data, as opposed to an entity that is only allowed to access (i.e., "read") such information and data. As described in greater detail below, the administrator device 108 may communicate with the system controller 102 during the process of commissioning a sensor 132.

In the illustrated embodiment, the system controller 102 may comprise a web interface 120, a database 122 and, a back end process 124 as shown in FIG. 1. As known in the art, the web interface 120, database 122 and back end process 124 may be implemented by one or more server computers implementing appropriate software programs known to those of skill in the art. The web interface 120 operates to provide, according to embodiments described below, one or more graphical user interfaces that may be displayed on a communication unit 104 and used to prompt an entity/user 110 for relevant data and information as described in further detail below. Techniques for implementing such graphical user interfaces are well known to those of skill in the art. In an alternative embodiment, a communication unit 104 may include an application 130 comprising software that is downloaded to and executed by the communication unit 104 to provide the graphical user interface(s) and to manage communications with the system controller 102. In this embodiment, the application 130 may be downloaded to the communication unit 104 from the system controller 102 or from some other source such as an application distribution platform, e.g., the so-called App Store site provided by Apple Inc. or the Google Play site provided by Google LLC.

The database 122 stores all data relevant to the commissioning of sensors including, for example, sensor-identifying data, sensed object context information, data concerning sensor types, identifications of sensor administrators as well as identification of entities having access to sensor data and prompts configured to solicit such data. In an embodiment, the database 122 may comprise a database management system (DBMS) operating on one or more suitable database server computers, as known in the art.

Finally, the back end process 124 is operatively coupled to both the web interface 120 and the database 122 in the illustrated embodiment. The back end process 124, which may be implemented by a suitably programmed computing device such as a server computer, directs operations of the system controller 102, as described below in further detail, for example, with reference to FIG. 5. For example, the back end process 124 manages the receipt, storage, maintenance, etc. of relevant data (received from an entity 110 via a communication units 104, or from an administrator 112 via an administrator device) concerning commissioning of sensor and/or access to sensor data/information.

Figure 2:
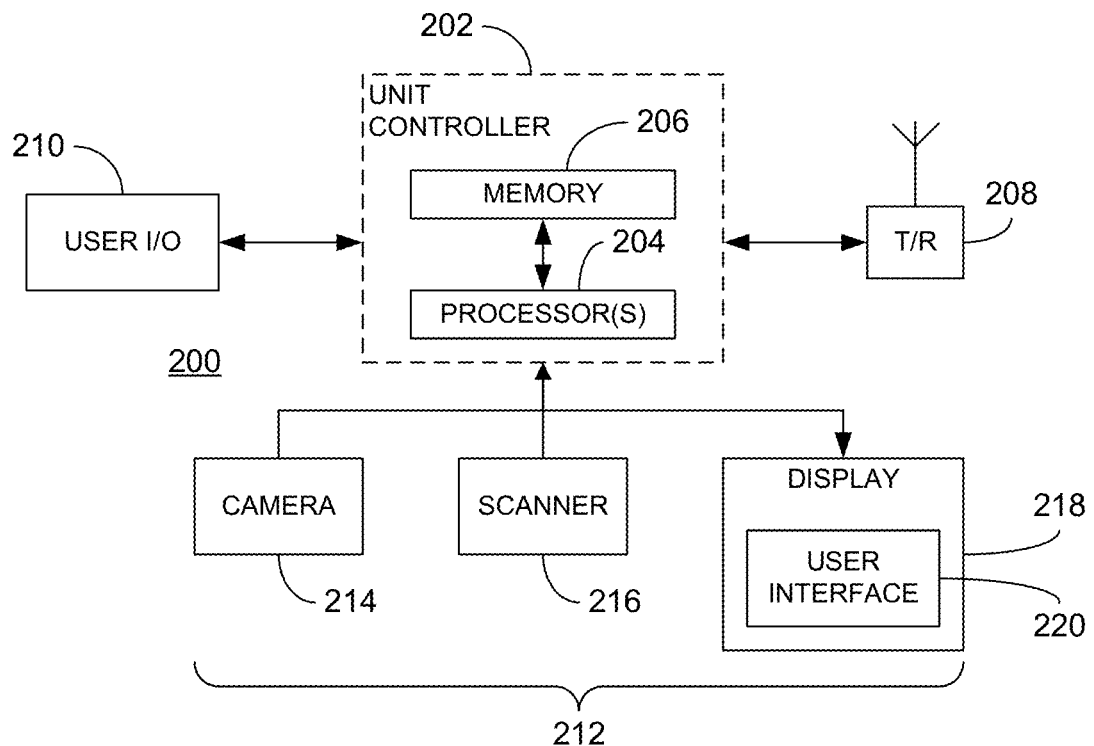
FIG. 2 is a block diagram illustrating an example of a communication unit suitable for use within a system for commissioning sensors in accordance with the instant disclosure.

Referring now to FIG. 2, one example of a communication unit 200 for use within a system 100 for servicing equipment is illustrated. The communication unit 200 may be used to implement, for example, one or more of the communication units 104, as shown in FIG. 1.

In the illustrated example, the communication unit 200 includes a unit controller 202 and, operatively connected thereto, a transceiver 208, a user input/output interface 210 and peripheral devices 212. The unit controller 202 includes one or more processors 204 and memory 206. In an embodiment, the one or more processors 204 may include one or more devices such as microprocessors, microcontrollers, digital signal processors, or combinations thereof, capable of executing stored instructions and operating upon stored data that is stored in, for example, memory 206. Memory 206 may include one or more devices such as volatile or non-volatile memory including, but not limited to, random access memory (RAM) or read only memory (ROM). Further still, memory 206 may be embodied in a variety of forms, such as a hard drive, optical disc drive, floppy disc drive, etc. Processor and memory arrangements of the types illustrated in FIG. 2 are well known to those having ordinary skill in the art. In one embodiment, the processing techniques described herein are implemented as a combination of executable instructions and data within the memory 206 used to control operation of, and operated upon by, the one or more processors 204.

The user input/output 210 may include any suitable components for receiving input from, and/or communicating output to, a user. For example, user input components could include a keypad, a touch screen, a mouse, a microphone and suitable voice recognition application, etc. User output components could include, for example, speaker(s), light(s) (e.g., one or more LED lights), buzzer(s) (e.g., one or more components capable of vibrating to alert the user, for example, of an incoming telephone call), etc. Other suitable input/output components will be discussed below with regard to peripheral devices 212. The transceiver 208 may comprise one or more suitable transceivers capable of transmitting and receiving information as known in the art. For example, the transceiver 208 may transmit and receive information using wireless communication resources implementing any of a variety of communication protocols, such as TDM (time-division multiplexed) slots, carrier frequencies, a pair of carrier frequencies, or any other radio frequency (RF) transmission media. Further still, although the transceiver 208 is illustrated in FIG. 2 as being wireless, those having ordinary skill in the art will appreciate that the transceiver may be additionally/alternatively capable of supporting communications using wired communication resources.

Peripheral devices 212 are any devices capable of providing data to, or receiving data from, the unit controller 202, non-limiting examples of which include a camera 214, a scanner 216 and a display 220. The camera 214 may comprise any suitable camera capable of capturing still images and/or video data using techniques known in the art. In one example, the camera 214 may include a digital camera configured to capture an image and/or video. The captured image/video may be stored locally, for example, in memory 206. The scanner 216 may include any suitable scanner capable of performing scanning operations using techniques known in the art. For example, the scanner 216 may be configured to perform scanning operations in accordance with well-known scanning techniques. These scanning techniques may include, for example, pen-type scanning, laser scanning, charge-coupled device array (CCD) scanning, omni-directional barcode scanning, QR code scanning, etc. Alternatively, the scanner 216 may be configured to perform RFID interrogation using known techniques. In short, the scanner 216 is configured to scan sensor-identifying features, as described above, using techniques well-known in the art. In one example, the camera 214 is configured to perform scanning operations as well. For example, in an embodiment, the camera 214 is operative to capture an image/video of a QR code deployed on a sensor for further processing. Capturing an image/video of an optical code using, for example, the camera 214 for further processing constitutes "scanning" within the meaning of the instant disclosure.

The display 218 may include any conventional integrated or external display mechanism such as a LED display, cathode ray tube (CRT) display, plasma display, LCD display, or any other display mechanism known to those having ordinary skill in the art. In an embodiment, the display 218, in conjunction with suitable stored instructions (e.g., suitable stored instructions stored in memory 206), may be used to implement a graphical user interface, such as graphical user interface 220. Implementation of a graphical user interface in this manner is well known to those having ordinary skill in the art. Additionally, as noted previously, peripheral devices such as the display 218 may instead be incorporated into the communication device 200 as part of, for example, the user input/output 210.

Figure 3:
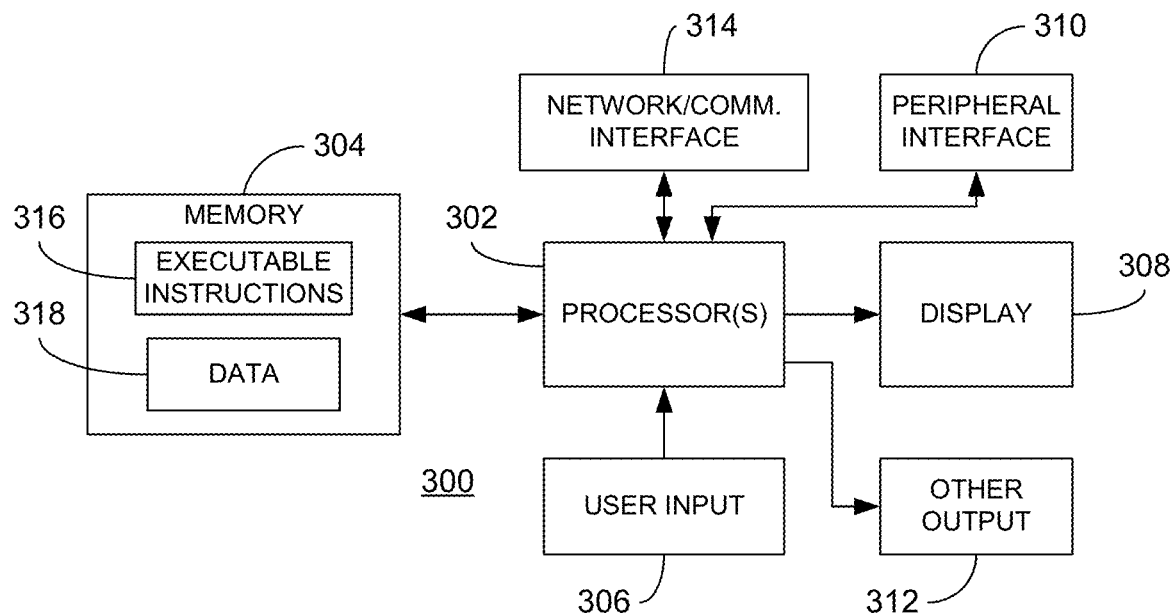
FIG. 3 is a block diagram illustrating an example of a processing device that may be used to implement various aspects of the teachings of the instant disclosure.

Referring now to FIG. 3, a representative processing device 300 that may be used to implement the teachings of the instant disclosure is illustrated. The device 300 may be used to implement, for example, the various processing or computing devices noted concerning the system controller 102 and administrator device 108. Regardless, the device 300 comprises a processor 302 coupled to a memory 304. The memory 304, in turn, comprises stored executable instructions 316 and data 318. In an embodiment, the processor 302 may comprise one or more of a microprocessor, microcontroller, digital signal processor, co-processor or the like or combinations thereof capable of executing the stored instructions 316 and operating upon the stored data 318. Likewise, the memory 304 may comprise one or more devices such as volatile or nonvolatile memory including but not limited to random access memory (RAM) or read only memory (ROM). Furthermore, the memory 304 may be embodied in a variety of forms, such as a hard drive, optical disc drive, floppy disc drive, etc. Processor and storage arrangements of the types illustrated in FIG. 3 are well known to those having ordinary skill in the art. In one embodiment, the processing techniques described herein relative to the system controller are implemented as a combination of executable instructions and data within the memory 304.

As shown, the device 300 may comprise one or more user input devices 306, a display 308, a peripheral interface 310, other output devices 312 and a network/communication interface 314 in communication with the processor 302. The user input device 306 may comprise any mechanism for providing user input (such as, for example, inputs specifying products history data, etc.) to the processor 302. For example, the user input device 306 may comprise a keyboard, a mouse, a touch screen, microphone and suitable voice recognition application or any other means whereby a user of the device 300 may provide input data to the processor 302. The display 308, may comprise any conventional display mechanism such as a cathode ray tube (CRT), flat panel display, or any other display mechanism known to those having ordinary skill in the art. The peripheral interface 310 may include the hardware, firmware and/or software necessary for communication with various peripheral devices, such as media drives (e.g., magnetic disk or optical disk drives), other processing devices or any other input source used in connection with the instant techniques. Likewise, the other output device(s) 312 may optionally comprise similar media drive mechanisms, other processing devices or other output destinations capable of providing information to a user of the device 300, such as speakers, LEDs, tactile outputs, etc. Finally, the network/communication interface 314 may comprise hardware, firmware and/or software that allows the processor 302 to communicate with other devices (such as communication units 104) via wired or wireless networks, whether local or wide area, private or public, as known in the art. For example, such networks may include the World Wide Web or Internet, or private enterprise networks, as known in the art.

While the device 300 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 300 may include a greater or lesser number of components than those illustrated. Once again, those of ordinary skill in the art will appreciate the wide number of variations that may be used is this manner. Further still, although a single processing device 300 is illustrated in FIG. 3, it is understood that a combination of such processing devices may be configured to operate in conjunction (for example, using known networking techniques) to implement the teachings of the instant disclosure.

Figure 4:
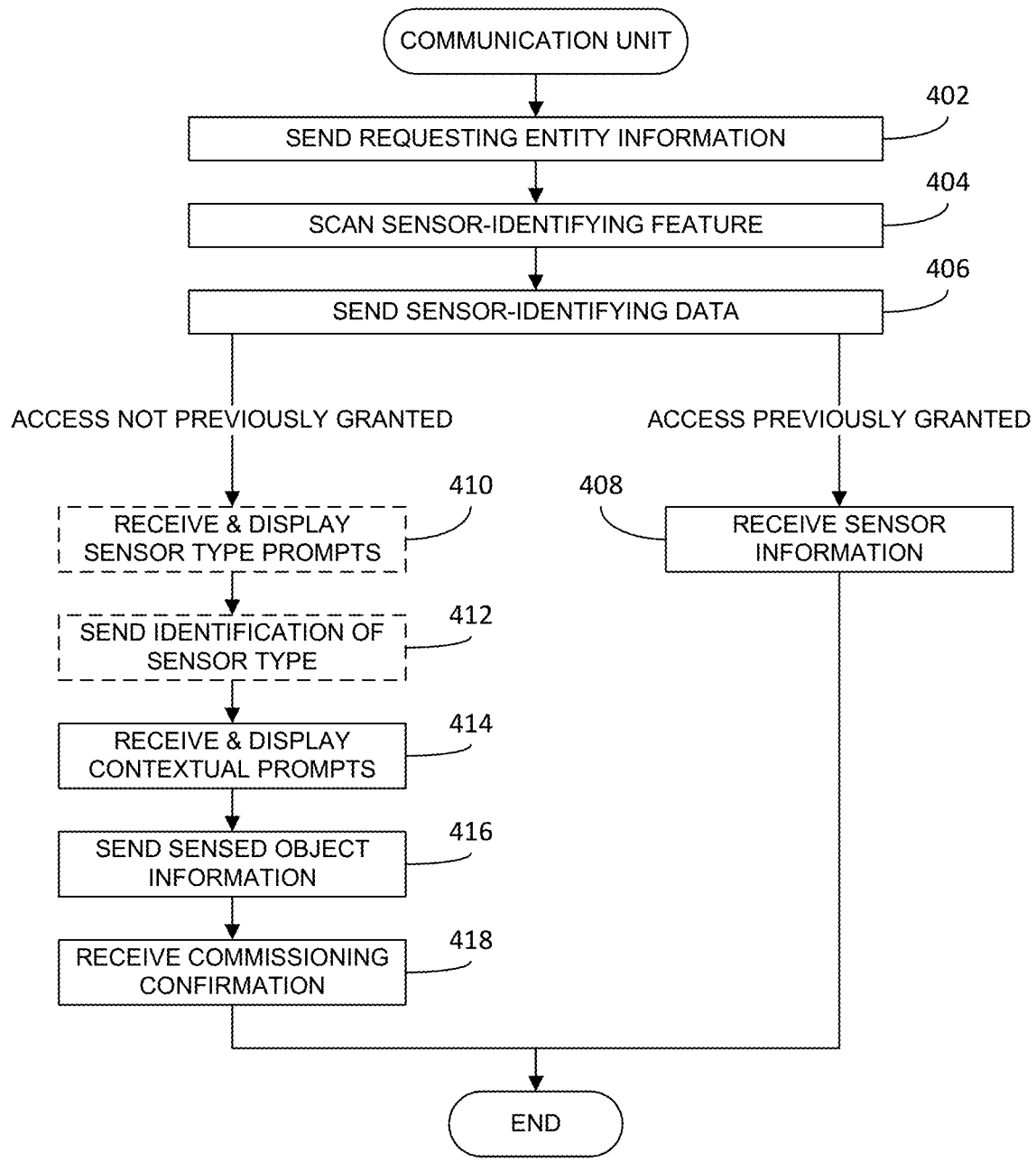
FIG. 4 is a flow chart illustrating processing by a communication unit in accordance with the instant disclosure.

In an embodiment, the system 100 illustrated in FIG. 1 functions to aid in the commissioning of sensors. Referring now to FIG. 4, processing, in accordance with the instant disclosure and that may be performed by a communication unit, is illustrated. For example, the processing illustrated in FIG. 4 may be implemented as stored instructions executed by a processor deployed in a communication unit as described above. Further, though a particular ordering of steps illustrated in FIG. 4 is shown, it is appreciated that this is not a requirement and that various ones of the illustrated steps may be performed out of the order shown.

Beginning at block 402, processing by the communication unit starts with the communication unit sending, to the system controller, information regarding an entity requesting commissioning of a sensor or access to a sensor's data. For example, the information regarding the requesting entity may comprise a unique identifier that serves as a verification of the identity of the entity requesting commissioning/access. This may be provided, in the case of a software application implemented by the communication unit or via a website implemented by the system controller, by having the entity or user provide a username and password in response to suitable prompts provided by the application/web site. Other identity verification techniques suitable for this purpose will be known to those skilled in the art.

Regardless, processing continues as block 404 where the communication unit performs a scan of a sensor-identifying feature of a sensor to provide sensor-identifying data. As noted above, this may be done, for example, through use of an optical scanning device assessing a suitable optical code (e.g., barcode or QR code) or an RFID reader interrogating an RFID tag, with the resulting data obtained through such scanning (possibly after decoding processing as known in the art) serving as the sensor-identifying data. Thereafter, the communication unit sends the sensor-identifying data to the system controller at block 406.

Having sent the information identifying the requesting entity and the sensor-identifying data to the system controller, continued processing at the communication unit may proceed along two separate paths as illustrated in FIG. 4, i.e., along a first path defined by block 408 or along a second path defined by blocks 410-418. The first path is followed when access to the given sensor's data has been previously granted to the requesting entity. As described below, such access exists when the requesting user either serves as the administrator of the given sensor, or has been granted such access by an administrator of the sensor. In this case, it necessarily follows that the sensor-identifying data provided by the communication unit has been previously provided by that communication unit (or, at least, at the instruction of the requesting entity). As a result, an instance of sensor-identifying data sent after commissioning or the granting of access may be thought of as subsequent sensor-identifying data. On the other hand, the second path is followed in those instances in which the requesting entity has not been previously granted access to the sensor's data, as would be the case where an administrator does not already exist for the sensor, or such access has not been previously granted to by the sensor's administrator. The process of determining the status of the requesting entity is performed by the system controller, as described in further detail below.

In the case where access to the given sensor's data has been previously granted to requesting entity, processing continues at block 408 where the communication unit receives information regarding the sensor from the system controller. Such information will necessarily depend on the nature of the sensor and the sensed object with which it is deployed. For example, in the case of a hubodometer, such information may include information regarding the sensed object such as an indication of the vehicle type (e.g., two-axled vehicle, a tractor, a trailer, etc.), vehicle identifying information (e.g., vehicle identification number (VIN)), an odometer reading of the hubodometer, etc. The received sensor information may be provided to a user of the mobile communication device via a suitable display and graphical user interface, an example of which is described in further detail below.

In the case where access to the given sensor's data has not been previously granted to the requesting entity, processing optionally continues at block 410 where the communication unit receives one or more sensor type prompts from the system controller, which prompts are subsequently presented to the user of the communication unit via, for example, a display and graphical user interface. If such sensor type prompts are provided, processing continues at block 412 where, based on user input data in response to the sensor type prompts, the communication unit sends an identification of a sensor type to the system controller. As will be appreciated by the skilled person, the identification of the sensor type may assist the system controller in determining what additional data may be required in order to complete the commissioning of the sensor. For example, in the case of a hubodometer, identification of the sensor as such serves as an indication that information regarding the vehicle with which the sensor is associated will be required. On the other hand, a sensor deployed in the context of a piece of manufacturing equipment in a factory may require different types of information in order to complete the commissioning process, e.g., a location of the sensor within the factory or the nature of the equipment with which the sensor is associated.

Regardless of whether sensor type identification occurs, processing continues at block 414 where the communication unit receives one or more contextual prompts from the system controller. As used herein, contextual prompts refer to questions aimed at soliciting information regarding the context that the sensor will be operating, i.e., information regarding the sensed object with which the sensor is associated when deployed. As described above, the exact nature of the contextual prompts may be influenced according to knowledge of the type of sensor at issue. Generally, the contextual prompts are provided in order to obtain information that will allow owners of the sensed object to quickly associate which assets are tied to their sensors. Aside from text input to questions, such contextual information may include a picture of the sensed object.

The contextual prompts may be presented to the user of the communication unit via any conventional technique, e.g., via graphical user interface on a display, such that the user is able to provide responses to the prompts. These responses, collectively referred to as sensed object context information, are then provided by the communication unit to the system controller at block 416. Thereafter, assuming that all processing required by the system controller to commission the sensor has been successfully completed, processing continues at block 418 where the communication unit receives confirmation of commissioning of the sensor from the system controller.

Figure 5:
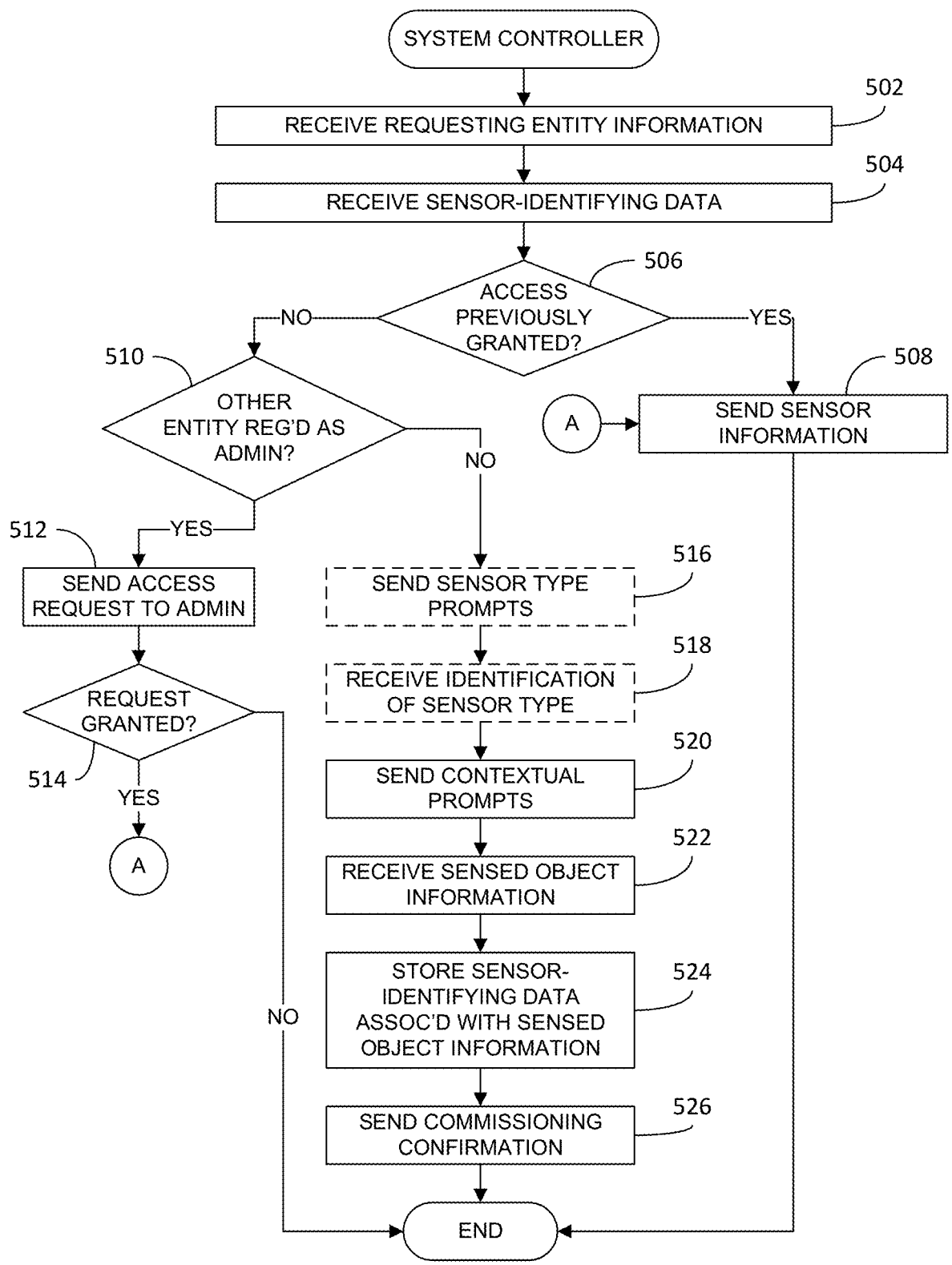
FIG. 5 is a flow chart illustrating processing by a system controller in accordance with the instant disclosure.

Referring now to FIG. 5, processing, that may be performed by a system controller and in accordance with the instant disclosure, is illustrated. For example, the processing illustrated in FIG. 5 may be implemented as stored instructions executed by a processor deployed in system controller as described above. Further, though a particular ordering of steps illustrated in FIG. 5 is shown, it is appreciated that this is not a requirement and that various ones of the illustrated steps may be performed out of the order shown.

Beginning at block 502, processing by the system controller starts with the system controller receiving, from the communication unit, the information identifying an entity requesting commissioning of a sensor or access to a sensor's data. Thereafter, at block 504, the system controller also receives, from the communication unit, the sensor-identifying data resulting from the communication unit scanning a sensor-identifying feature of the sensor in question.

With this information and data in hand, processing continues at block 506 where the system controller determines whether access to the sensor's data has been previously granted for the identified requesting entity. As noted above, the veracity of the identity of the requesting entity may be assumed by the system controller where a sufficiently robust login procedure to a software application on the communication unit, or to a web site implemented by the system controller, has been successfully completed. In an embodiment, the processing of step 506 can be implemented through the use of a table of sensor identifications each having associated therewith the identities of any entities authorized to access stored data for that sensor. Once again, such access will be available in those instances in which the requesting entity has been previously deemed the administrator of the sensor in question, or granted such access rights by the administrator of the sensor.

Regardless of how it is determined, if the query at step 506 is answered in the affirmative, i.e., the requesting entity has access rights already granted, processing continues at step 508 where the system controller sends information regarding the sensor to the communication unit.

If, instead, the query at step 506 is answered in the negative, i.e., that the requesting entity does not have access rights already granted, two possibilities exist: first, that no one has yet been appointed as an administrator of the sensor in question (i.e., this is an initial commissioning of the sensor) or, second, an administrator of the sensor already exits, but has not yet granted access rights to the requesting entity. These two options are then considered at block 510 where it is determined whether the sensor in question has any entity registered as an administrator. Again, this query could be assessed by reviewing a table of known sensors to see if the sensor in question is in the table and, if so, if any administrator is associated therewith. If the sensor in question is not represented in the table, then by necessity there cannot have been any entity registered as its administrator. If the query of block 510 is answered in the affirmative, then processing continues at block 512 where the system controller sends an access request to an administrator device, as described above. The access request can take any suitable form (e.g., an email, a text message, etc.) and indicate the identity of the sensor in question and the identity of the requesting entity. If the administrator denies the request, i.e., answers the query at block 514 in the negative, then further processing discontinues, with the possible exception of a message to the communication unit that access to the sensor's data has been denied by the sensor's administrator. Otherwise, if the administrator allows the request, i.e., answers the query at block 514 in the affirmative, processing once again continues at block 508 where the system controller sends the information regarding the sensor to the communication unit. Additionally, the identification of the requesting entity is thereafter stored in association with the sensor-identifying data such that future queries against the sensor-identifying data will reveal the that the requesting entity has been previously granted access to the sensor's data.

Referring once again to block 510, if it is determined that no administrator has yet been registered for the sensor in question, then it is presumed that the sensor is in need of initial commissioning and processing continues at optional block 516. At optional block 516, the system controller sends the one or more sensor type prompts to the communication unit. If such sensor type prompts are provided, processing continues at optional block 518 where, based on user input data in response to the sensor type prompts, the system controller receives an identification of a sensor type from the communication unit.

Regardless of whether sensor type identification occurs, processing continues at block 520 where the system controller receives one or more contextual prompts from the communication unit. In response to the contextual prompts, the system controller receives, at block 522, sensed object context information from the communication unit. Then, at block 524, the system controller stores the sensor-identifying data in association with sensed object context information. Additionally, the information identifying the requesting entity as the administrator of the sensor is also stored in association with the sensor-identifying data. Having thus completed commissioning of the sensor, processing continues at block 526 where confirmation of commissioning of the sensor is sent by the system controller to the communication unit.

Referring now to FIGS. 6-13, various examples of graphical user interfaces that may be used in conjunction with the above-described processing are further described. As noted above, such graphical user interfaces may be presented via a display of a communication unit. In particular, the graphical users interfaces depicted in FIGS. 6-13 may be used in the case in which the sensors in question are hubodometers as described above, and the communication unit comprises a smart phone. Thus, beginning with FIG. 6, a graphical user interface 600 is shown depicting an initial or home screen 602 of a software application or web site in map form. For example, using known techniques, the illustrated map may illustrate the locations 604 of known sensors (only one shown for ease of illustration) as well as a location 606 of the entity (user) associated with the communication unit. In the case where a newly deployed sensor is being initially commissioned, the home screen 602 includes a user-selectable mechanism 608, i.e., a button labeled, in this case, "Link a device," that initiates commissioning of the newly deployed sensor.

Figure 7:
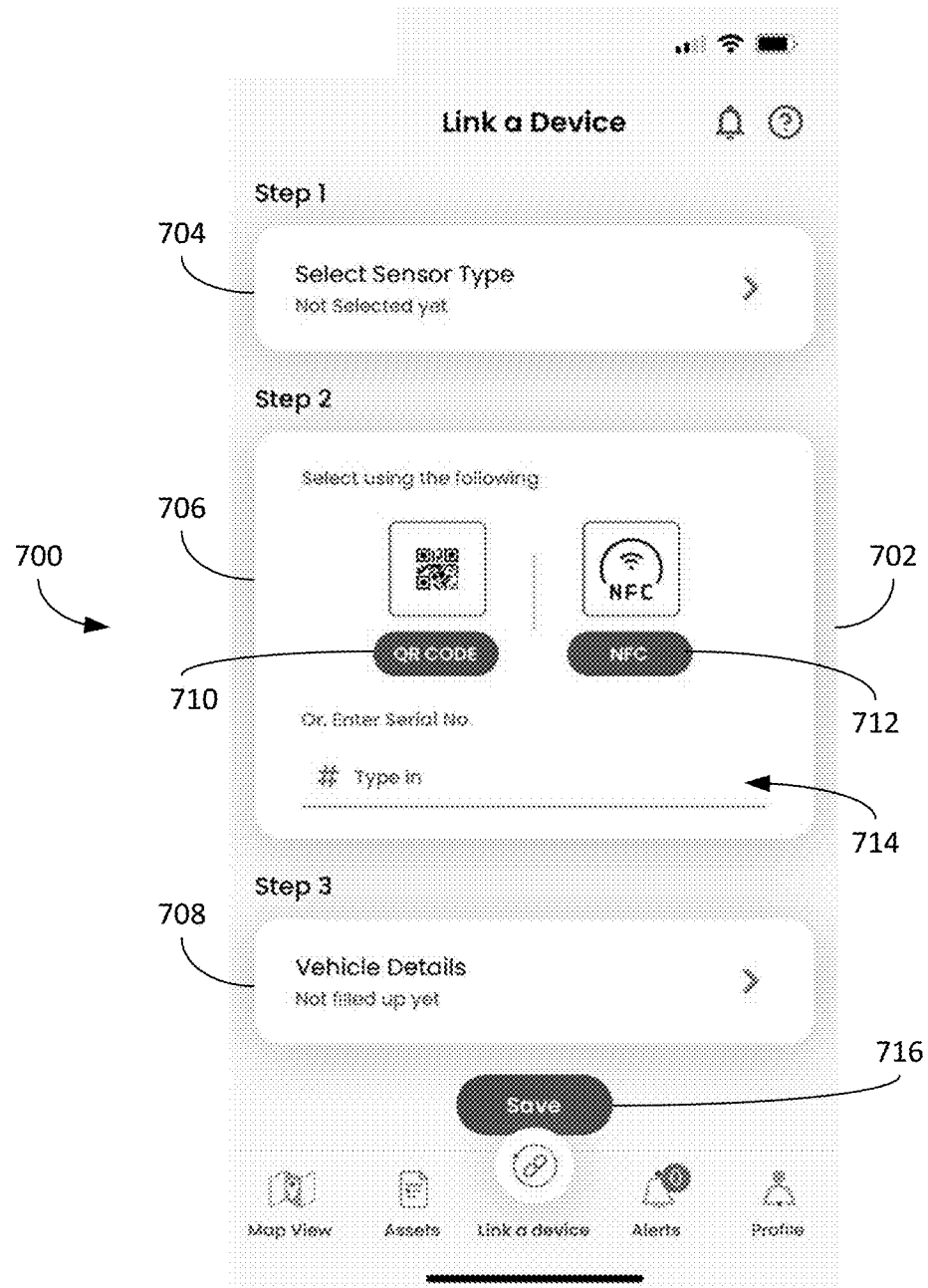
Figure 8:
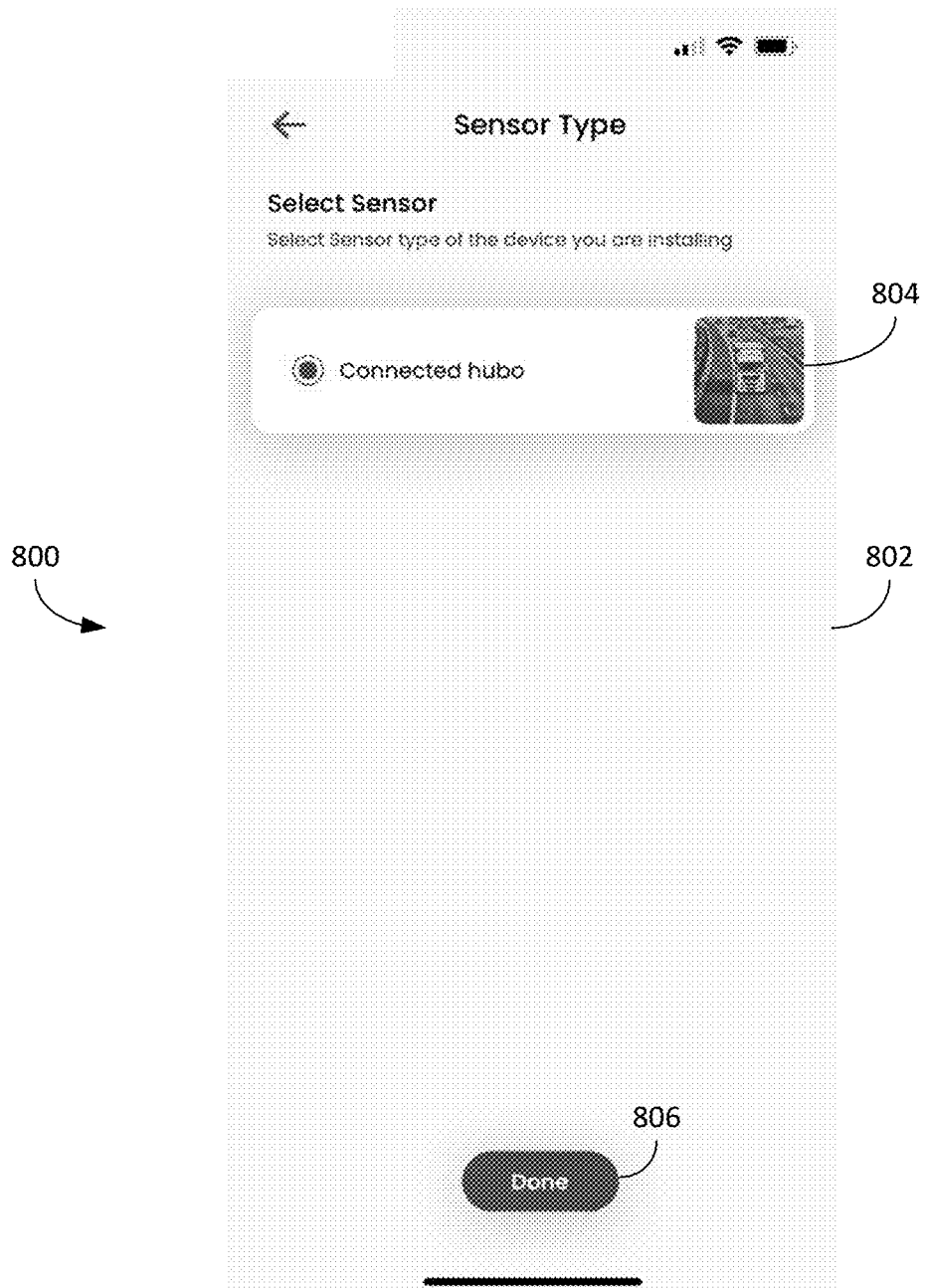

Upon selection of the "Link a device" button 608, a graphical user interface 700 as shown in FIG. 7 is provided. In this graphical user interface 700, a commissioning process screen 702 depicts sensor commissioning as a three step process including a first, sensor type selection step 704, a second, sensor scanning step 706 and a third, sensor context step 708. The fields depicting each of the three steps 704-708 is a user selectable mechanism that allows a user to select a given step and be directed to another graphical user interface implementing processing associated with that step. In the illustrated example, actuation of the mechanism corresponding to the sensor type selection step 704 causes the user's display to be reformatted according to the graphical user interface 800 as depicted in FIG. 8, which includes a sensor type selection screen 802. In this example, the sensor type selection screen 802 provides one or more user selectable mechanisms (e.g., radio buttons and corresponding descriptions; i.e., sensor type prompts as described above) corresponding to one or more sensor types. For ease of illustration, only a single sensor type—"connected hubo" or hubodometer—is shown in FIG. 8. After a user make a sensor type selection, the user may select a "done" button 806, thereby saving the selected sensor type as a piece of information to be associated with the sensor in question.

After selection of the "done" button 806, the graphical user interface 700 is again presented. At this time, though not shown in FIG. 7, because the first step has been completed, the sensor type information (e.g., "connected hubo") can be depicted where the selection mechanism for step 1 shows the text "Not selected yet" in FIG. 7. Regardless, having completed the first step, the user may then select a selection mechanism 710-712 for sensor scanning step 706. In particular, the various selection mechanisms 710-714 shown in FIG. 7 permit a user to select whichever scanning or data entry mechanism is preferred. In the illustrated example, and assuming an appropriately equipped communication unit, a first user selection mechanism 710 provides QR scanning functionality whereas a second user selection mechanism 712 provides NFC scanning. Though not preferred, a third user selection mechanism 714 may be provided to permit manual data entry of sensor-identifying data. In this example, it is assumed that the user actuates the first user selection mechanism 710 that, in turn, causes the graphical user interface 900 of FIG. 9 to be displayed, which depicts a QR code reader screen 902. In accordance with known techniques, the QR code reader screen 902 includes a camera viewing area 904 includes alignment guides 906 that facilitate alignment of the camera with the sensor-identifying feature 908 (a QR code, in this case) such that the QR code is automatically captured and decoded to provide the sensor-identifying data 910, which then auto-filled into a manual entry field 911, as shown. Having thus captured the sensor-identifying data 910, the user once again selects a "done" button 912, which automatically saves the sensor-identifying data 910.

Figure 10:
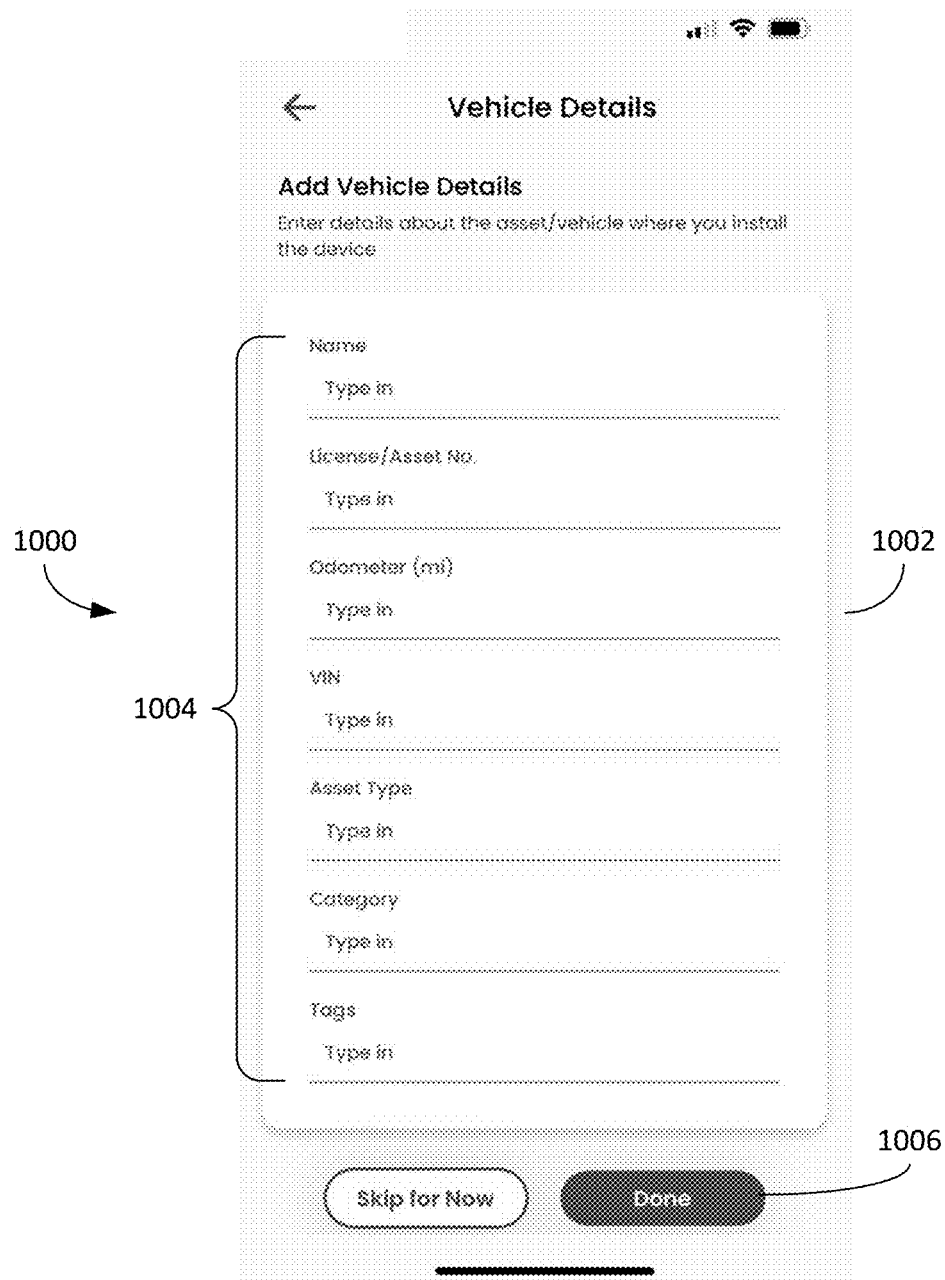

After selection of the "done" button 912, the graphical user interface 700 is again presented. At this time, though not shown in FIG. 7, because the second step has been completed, the sensor-identifying data 910 can be depicted in the manual data entry field 714 depicted in FIG. 7. Regardless, having completed the second step, the user may then select the user selectable mechanism corresponding to the sensor context step 708, which causes the user's display to be reformatted according to the graphical user interface 1000 as depicted in FIG. 10, which includes, in this case, a vehicle details screen 1002. In this example, the vehicle details screen 1002 include a plurality of manual data entry fields (i.e., contextual prompts as described above) corresponding to data fields that allow the user to enter, by way of non-limiting examples, a name of the vehicle (i.e., the sensed object as described above), a license/asset number for the vehicle, an odometer reading of the vehicle, a VIN of the vehicle, an asset type, a category and tags (e.g., license plates) for the vehicle. Having thus captured the sensed object context information, the user once again selects a "done" button 1006, which automatically saves the sensed object context information.

Figure 11:
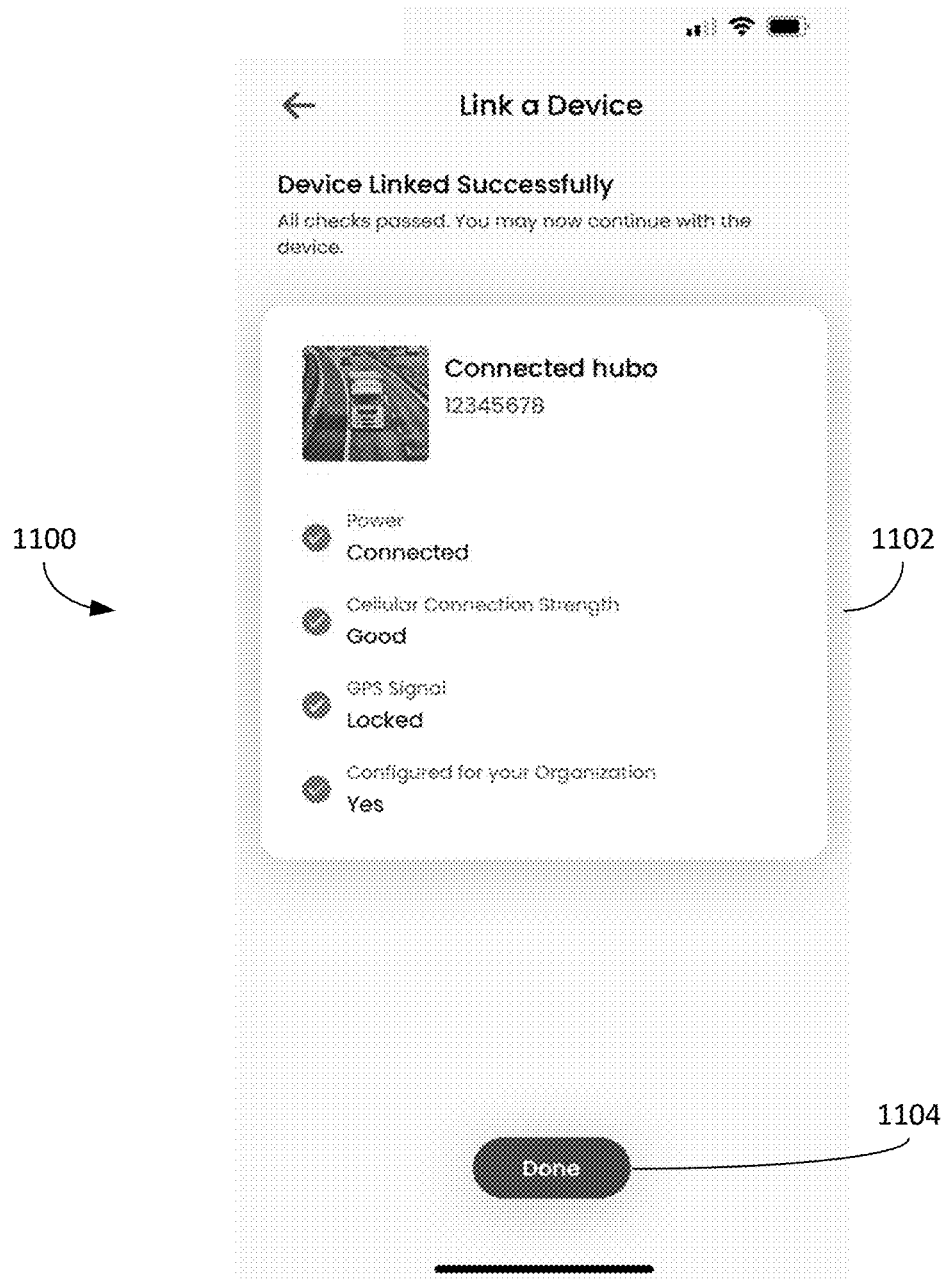

Having, at this point, completed all three steps illustrated in the commissioning process screen 702, the user may select a "save" button 716 to complete the commissioning process. That is, selection of the save button 716 causes the data obtained through completion of the three steps 704-708 to be provided to the system controller as described above. Thereafter, assuming that no errors occur at the system controller, the communication unit is presented with, and displays, a graphical user interface 1100 as shown in FIG. 11, which includes a confirmation screen 1102. As shown, the confirmation screen 1102 includes various status fields and their corresponding values (e.g., Power, Cellular Connection Strength, GPS Signal, etc.). After reviewing the confirmation screen 1102, the user may select a "done" button 1104, once again returning the user to graphical user interface 1200 comprising a home screen 1202 as depicted in FIG. 12.

Figure 6:
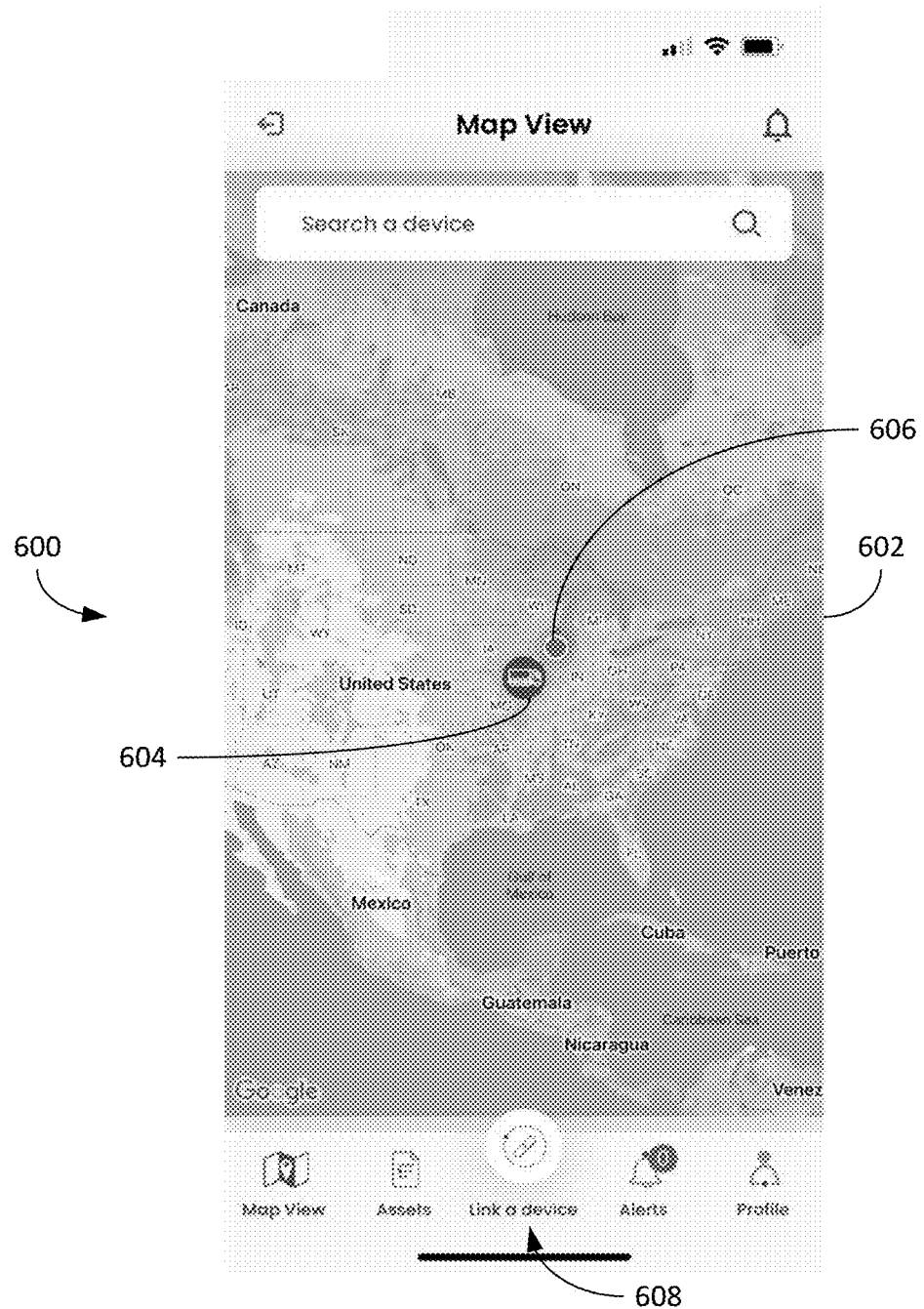
FIGS. 6-13 are screen shots of various example user interface screens in accordance with the instant disclosure.
Figure 12:
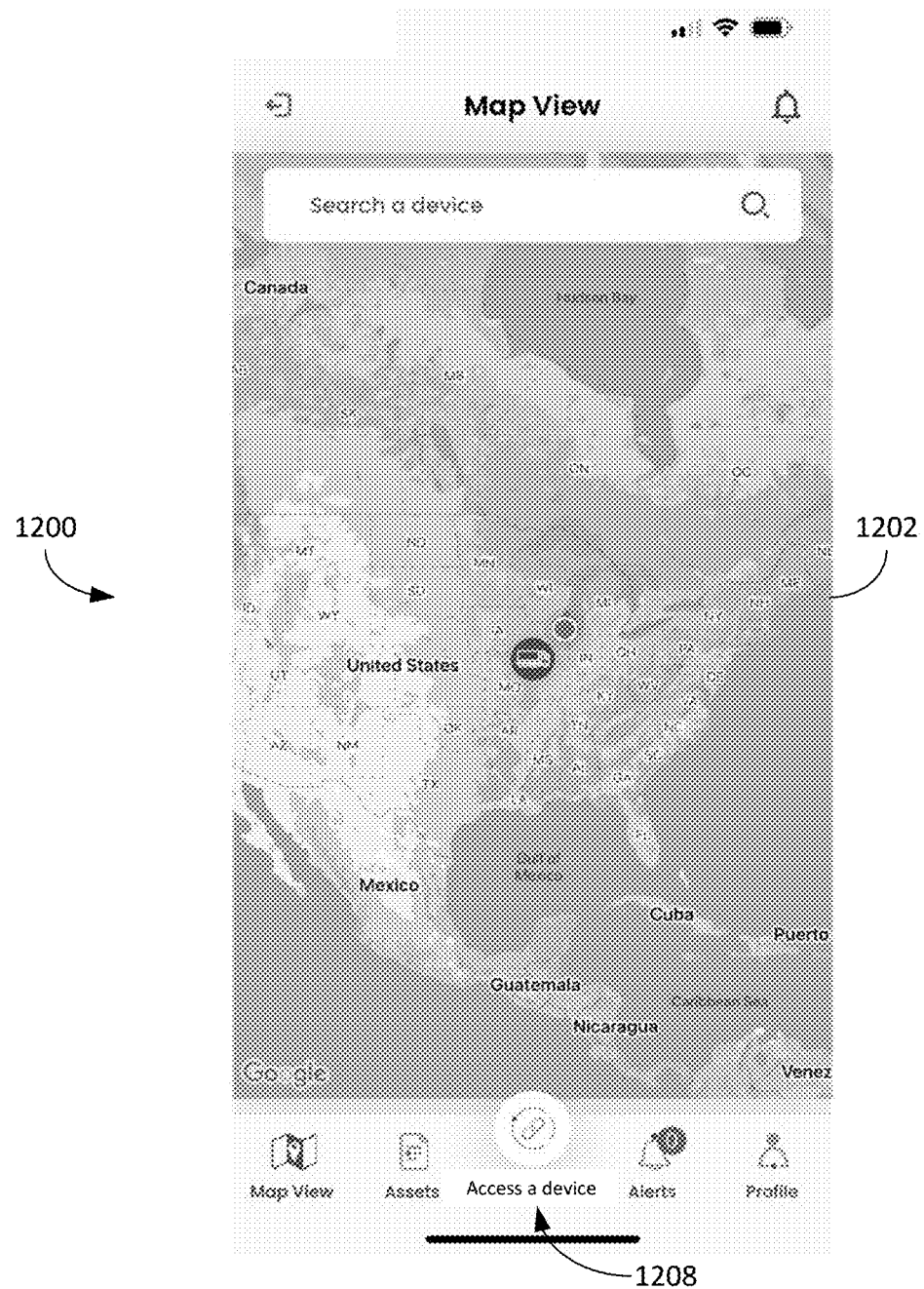
Figure 13:
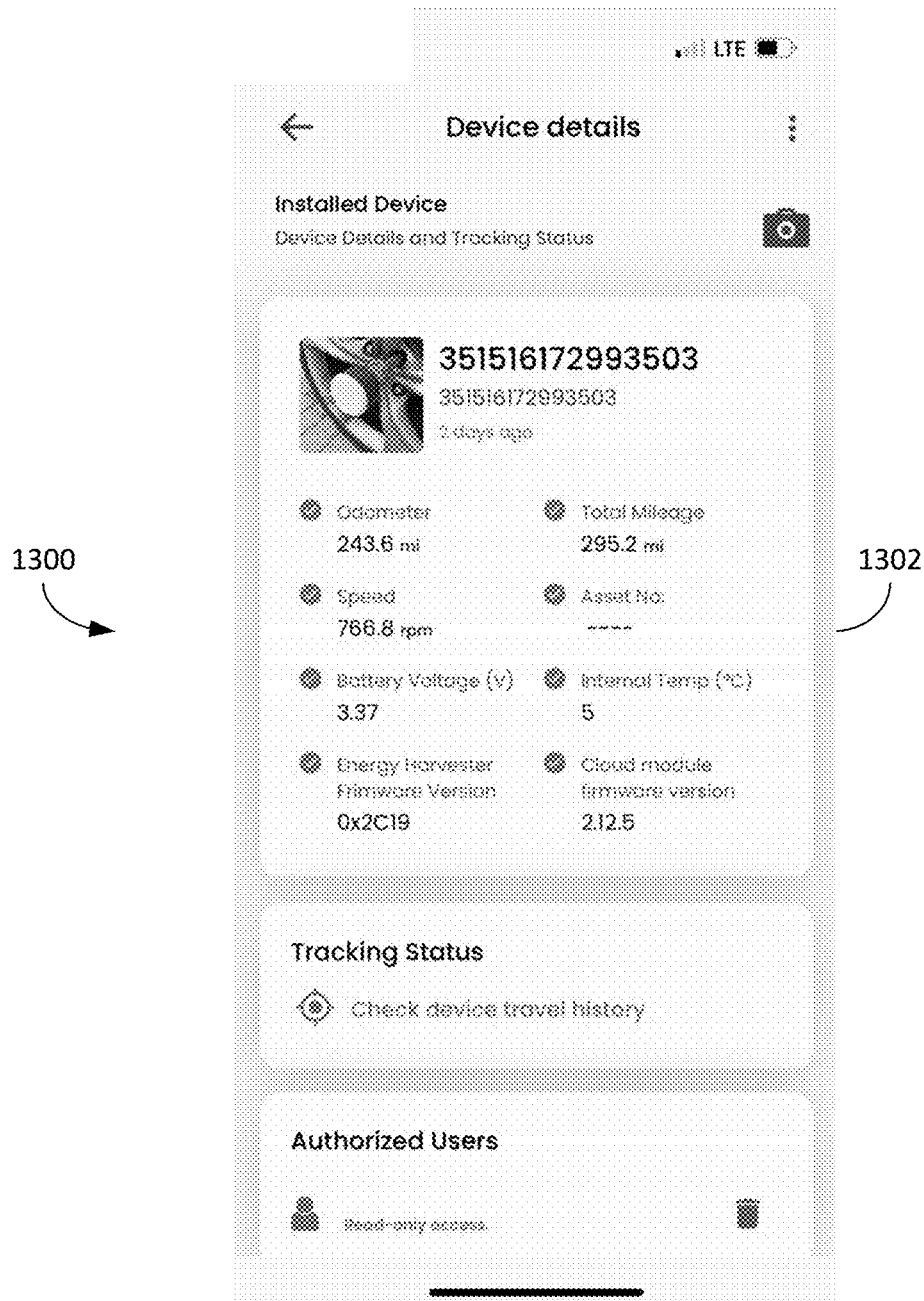

The home screen 1202 shown in FIG. 12 is substantially identical to the home screen 602 depicted in FIG. 6, with the exception that the "Link a device" button 608 in FIG. 6 has been replaced with an "Access a device" button 1208 as shown in FIG. 12, reflecting the fact that the entity/user of the mobile device now has access and/or administrator privileges with at least one field-deployed (and commissioned) sensor. Alternatively, the button 1208 could be a dual purpose button, e.g., "Link/Access a device." In this case, when an entity first uses the software application or website, with no existing sensors linked to the account, this state is designated by a flag variable in the system controller such that the software application or website is instructed to default to the "link a device" screen shown in FIG. 7.

Figure 9:
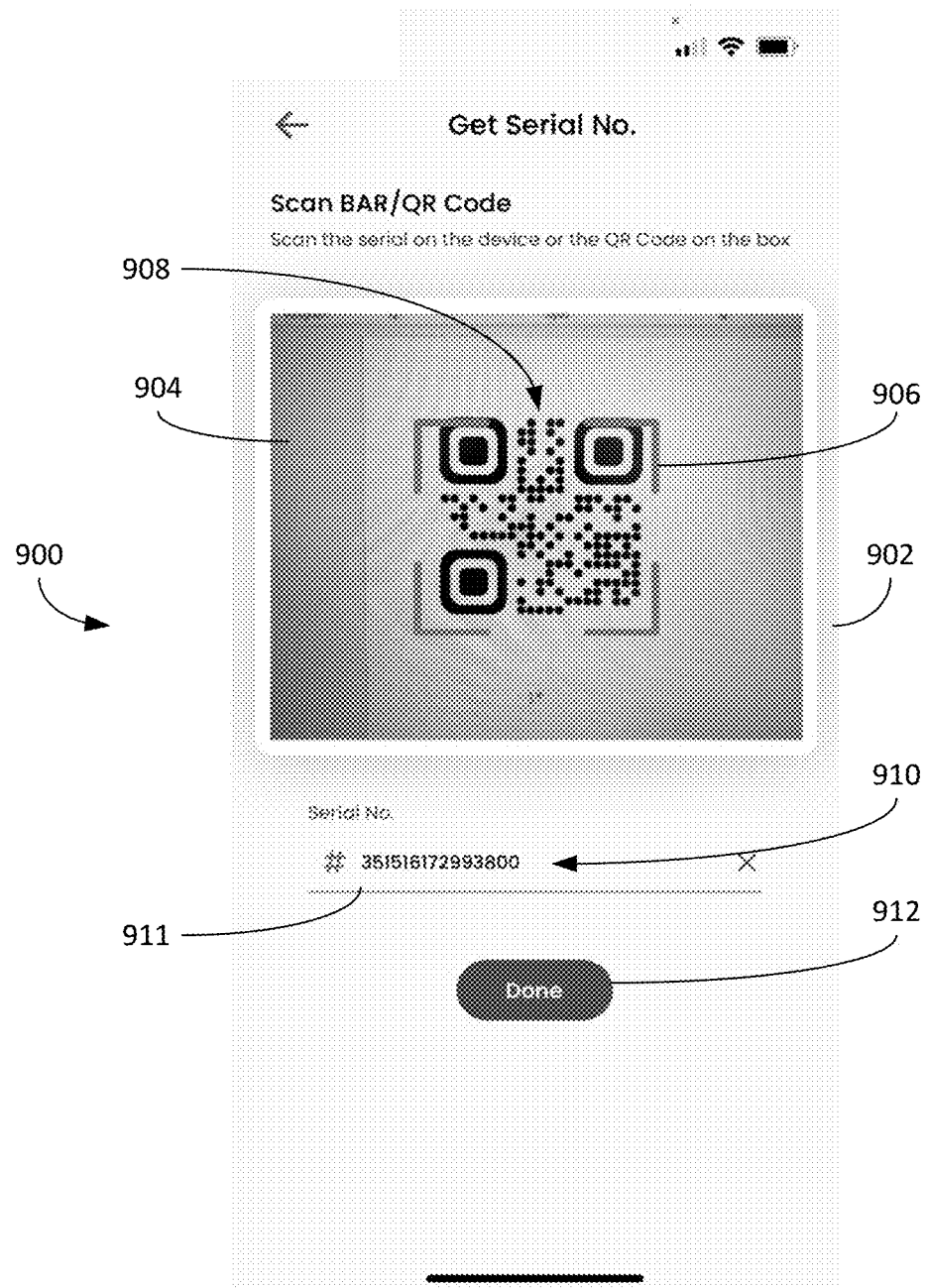

Regardless, when the user selects the "Access a device" button 1208, the communication unit is once again provided with and displays the graphical user interface 900 of FIG. 9, comprising the QR code reader screen 902. In this example, the QR code reader screen 902 is presented as a default. However, it may also be desired in this situation to provide a user with the various available options for scanning as shown, for example, in FIG. 7 by the scanning selection mechanisms 710, 712. In order to access data for a given sensor, the QR code reader screen 902 allows the user to once again scan a sensor-identifying feature (QR code in this case) to automatically obtain the sensor-identifying data 910 for the sensor in question. In this case, however, selection of the done button 912 causes a screen 1302 comprising information regarding the scanned sensor to be presented by the communication unit as depicted, for example, in the graphical user interface 1300 shown in FIG. 13.

While the various embodiments in accordance with the instant disclosure have been described in conjunction with specific implementations thereof, it is evident that many alternatives, modifications and variations will be apparent to those skilled in the art. Accordingly, the preferred embodiments of the invention as set forth herein are intended to be illustrative only and not limiting so long as the variations thereof come within the scope of the appended claims and their equivalents.

What is claimed is:

1. A method for commissioning a sensor via a communication unit, the method comprising:
   scanning, by the communication unit, a sensor-identifying feature of the sensor to provide sensor-identifying data;
   sending, by the communication unit to a system controller, the sensor-identifying data;
   receiving, by the communication unit from the system controller, one or more contextual prompts regarding a sensed object to which the sensor is operatively connected, wherein the sensed object is an object having one or more parameters that are subject to being sensed by the sensor and wherein the contextual prompts solicit information regarding the context in which the sensor will be operating and that permit association of the sensed object with the sensor;
   sending, by the communication unit to the system controller, sensed object context information in response to the contextual prompts; and
   receiving, by the communication unit from the system controller, confirmation of commissioning of the sensor.

2. The method of claim 1, further comprising:
   receiving, by the communication unit from the system controller, one or more sensor type prompts; and
   sending, by the communication unit to the system controller, an identification of a type of the sensor.

3. The method of claim 1, further comprising:
   sending, by the communication unit to the system controller, information regarding an entity requesting commissioning of the sensor; and
   after sending the sensor-identifying data, receiving, by the communication unit from the system controller, confirmation that an entity affiliated with the communication unit is authorized to access information regarding the sensor.

4. The method of claim 1, wherein the sensed object is a vehicle and the sensor is a hubodometer.

5. The method of claim 4, wherein the sensed object context information includes at least one of vehicle identifying information, vehicle type information or odometer reading of the vehicle.

6. The method of claim 5, wherein the sensor-identifying feature is any one of a barcode, a QR code or an RFID tag.

7. The method of claim 1, further comprising, subsequent to receiving the confirmation of commissioning:
   scanning, by the communication unit, the sensor-identifying feature of the sensor to provide subsequent sensor-identifying data;
   sending, by the communication unit to the system controller, the subsequent sensor-identifying data; and
   receiving, by the communication unit from the system controller responsive to the subsequent sensor-identifying data, information regarding the sensor.

8. A communication unit configured for commissioning a sensor, the communication unit comprising:
   a wireless transceiver configured to communicate with a system controller;
   a scanner;
   a processor; and
   memory operatively connected to the processor, the memory comprising executable instructions that when executed by the processor cause the processor to:
      scan, via the scanner, a sensor-identifying feature of the sensor to provide sensor-identifying data;
      send, via the wireless transceiver to the system controller, the sensor-identifying data;
      receive, via the wireless transceiver from the system controller, one or more contextual prompts regarding a sensed object to which the sensor is operatively connected, wherein the sensed object is an object having one or more parameters that are subject to being sensed by the sensor and wherein the contextual prompts solicit information regarding the context in which the sensor will be operating and that permit association of the sensed object with the sensor;
      send, via the wireless transceiver to the system controller, sensed object context information in response to the contextual prompts; and
      receive, via the wireless transceiver from the system controller, confirmation of commissioning of the sensor.

9. The communication unit of claim 8, wherein the memory further comprises executable instructions that, when executed by the processor cause the processor to:
   receive, via the wireless transceiver from the system controller, one or more sensor type prompts; and
   send, via the wireless transceiver to the system controller, an identification of a type of the sensor.

10. The communication unit of claim 8, wherein the memory further comprises executable instructions that, when executed by the processor cause the processor to:
   send, via the wireless transceiver to the system controller, information regarding an entity requesting commissioning of the sensor; and
   after sending the sensor-identifying data, receive, via the wireless transceiver from the system controller, confirmation that an entity affiliated with the communication unit is authorized to access information regarding the sensor.

11. The communication unit of claim 8, wherein the sensed object is a vehicle and the sensor is a hubodometer.

12. The communication unit of claim 11, wherein the sensed object context information includes at least one of vehicle identifying information, vehicle type information or odometer reading of the vehicle.

13. The communication unit of claim 12, wherein the sensor-identifying feature is any one of a barcode, a QR code or an RFID tag.

14. The communication unit of claim 8, wherein the memory further comprises executable instructions that, when executed by the processor cause the processor to, subsequent to receiving the confirmation of commissioning:
   scan, via the scanner, the sensor-identifying feature of the sensor to provide subsequent sensor-identifying data;
   send, via the wireless transceiver to the system controller, the subsequent sensor-identifying data; and
   receive, via the wireless transceiver from the system controller responsive to the subsequent sensor-identifying data, information regarding the sensor.

15. A method for commissioning a sensor via a system controller, the method comprising:
   receiving, by the system controller from a communication unit, sensor-identifying data obtained by the communication unit by scanning a sensor-identifying feature of the sensor;
   sending, by the system controller to the communication unit, one or more contextual prompts regarding a sensed object to which the sensor is operatively connected, wherein the sensed object is an object having one or more parameters that are subject to being sensed by the sensor and wherein the contextual prompts solicit information regarding the context in which the sensor will be operating and that permit association of the sensed object with the sensor;
   receiving, by the system controller from the communication unit, sensed object context information in response to the contextual prompts;
   storing, by the system controller, the sensor-identifying data in association with the sensed object information; and
   sending, by the system to controller to the communication unit, confirmation of commissioning of the sensor.

16. The method of claim 15, further comprising:
   receiving, by the system controller from the communication unit, information identifying an entity affiliated with the communication unit;
   after receiving the sensor-identifying data, determining, by the system controller, that the entity affiliated with the communication unit is authorized to access information regarding the sensor; and
   sending, by the system controller to the communication unit, confirmation that the entity is authorized to access information regarding the sensor.

17. The method of claim 16, wherein determining that the entity is authorized to access information regarding the sensor further comprises:
   sending, by the system controller to a device affiliated with an administrator of the sensor, a request to confirm that the entity is authorized to access to the information regarding the sensor; and
   receiving, by the system controller from the device affiliated with the administrator, confirmation that the entity is authorized to access information regarding the sensor.

18. The method of claim 15, further comprising:
   sending, by the system controller to the communication unit, one or more sensor type prompts; and
   receiving, by the system controller from the communication unit, an identification of a type of the sensor.

19. The method of claim 15, wherein the sensed object is a vehicle and the sensor is a hubodometer.

20. The method of claim 19, wherein the sensed object context information includes at least one of vehicle identifying information, vehicle type information or odometer reading of the vehicle.

21. The method of claim 15, wherein the sensor-identifying feature is any one of a barcode, a QR code or an RFID tag.

22. The method of claim 15, further comprising, subsequent to sending the confirmation of commissioning:
   receiving, by the system controller from the communication unit, the sensor-identifying data of the sensor to provide subsequent sensor-identifying data;
   sending, by system controller to the communication unit responsive to the subsequent sensor-identifying data, information regarding the sensor.

23. A system controller configured for commissioning a sensor, the system controller comprising:
- a communication interface configured to communicate with a communication unit;
- a processor; and
- memory operatively connected to the processor, the memory comprising executable instructions that when executed by the processor cause the processor to:
  - receive, via the communication interface from the communication unit, sensor-identifying data obtained by the communication unit by scanning a sensor-identifying feature of the sensor;
  - send, via the communication interface to the communication unit, one or more contextual prompts regarding a sensed object to which the sensor is operatively connected, wherein the sensed object is an object having one or more parameters that are subject to being sensed by the sensor and wherein the contextual prompts solicit information regarding the context in which the sensor will be operating and that permit association of the sensed object with the sensor;
  - receive, via the communication interface from the communication unit, sensed object context information in response to the contextual prompts;
  - store the sensor-identifying data in association with the sensed object context information; and
  - send, via the communication interface to the communication unit, confirmation of commissioning of the sensor.

24. The system controller of claim 23, wherein the memory further comprises executable instructions that, when executed by the processor cause the processor to:
- receive, via the communication interface from the communication unit, information identifying an entity affiliated with the communication unit;
- after receiving the sensor-identifying data, determine that the entity affiliated with the communication unit is authorized to access information regarding the sensor; and
- send, via the communication interface to the communication unit, confirmation that the entity is authorized to access information regarding the sensor.

25. The system controller of claim 24, wherein those executable instructions that cause the processor to determine that the entity is authorized to access information regarding the sensor are further operative to cause the processor to:
- send, via the communication interface to a device affiliated with an administrator of the sensor, a request to confirm that the entity is authorized to access to the information regarding the sensor; and
- receive, via the communication interface from the device affiliated with the administrator, confirmation that the entity is authorized to access information regarding the sensor.

26. The system controller of claim 23, wherein the memory further comprises executable instructions that, when executed by the processor cause the processor to:
- send, via the communication interface to the communication unit, one or more sensor type prompts; and
- receive, via the communication interface from the communication unit, an identification of a type of the sensor.

27. The system controller of claim 23, wherein the sensed object is a vehicle and the sensor is a hubodometer.

28. The system controller of claim 27, wherein the sensed object context information includes at least one of vehicle identifying information, vehicle type information or odometer reading of the vehicle.

29. The system controller of claim 23, wherein the sensor-identifying feature is any one of a barcode, a QR code or an RFID tag.

30. The system controller of claim 23, wherein the memory further comprises executable instructions that, when executed by the processor cause the processor to:
- subsequent to sending the confirmation of commissioning, receive, via the communication interface from the communication unit, the sensor-identifying data of the sensor to provide subsequent sensor-identifying data;
- send, via the communication interface to the communication unit responsive to the subsequent sensor-identifying data, information regarding the sensor.

* * * * *